United States Patent Office 3,427,063
Patented Feb. 11, 1969

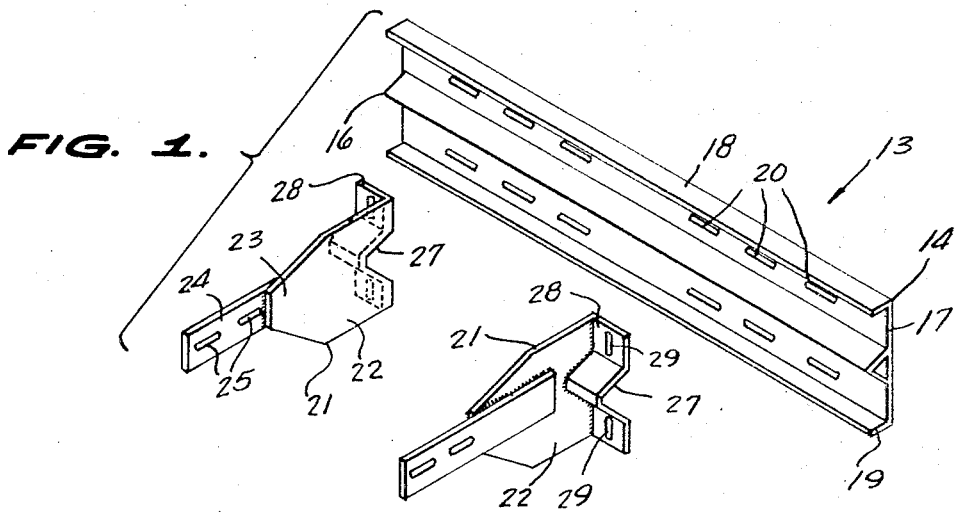
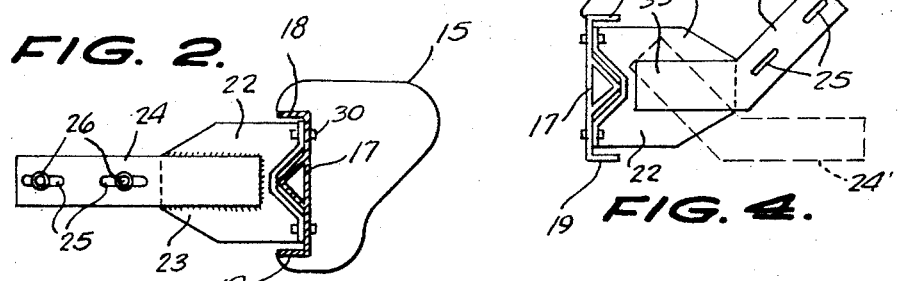
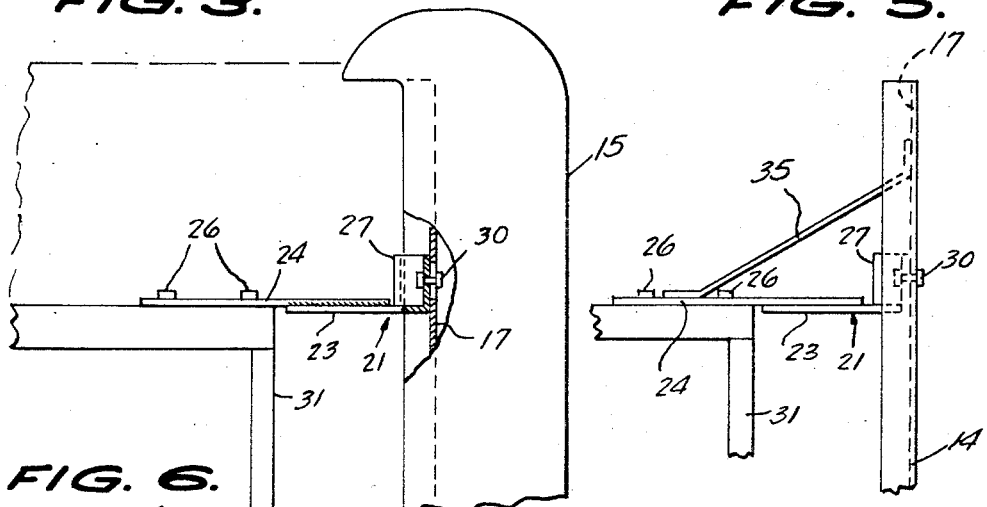
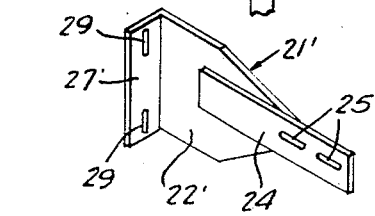
INVENTOR.
LAWRENCE D. TAYLOR,
BY
*Berman, Davidson & Berman*
ATTORNEYS.

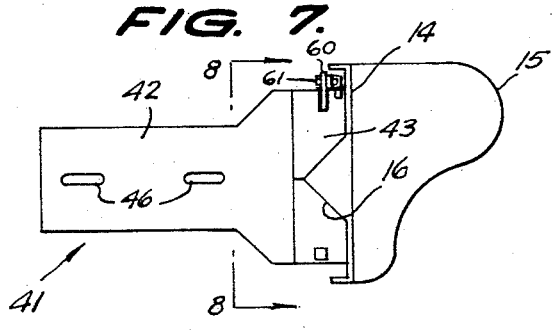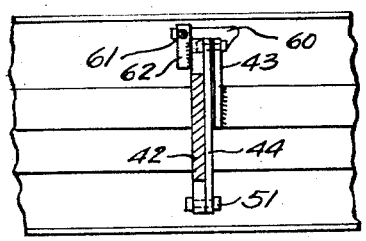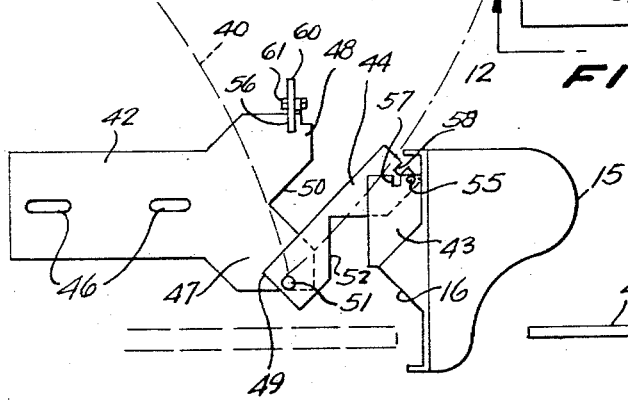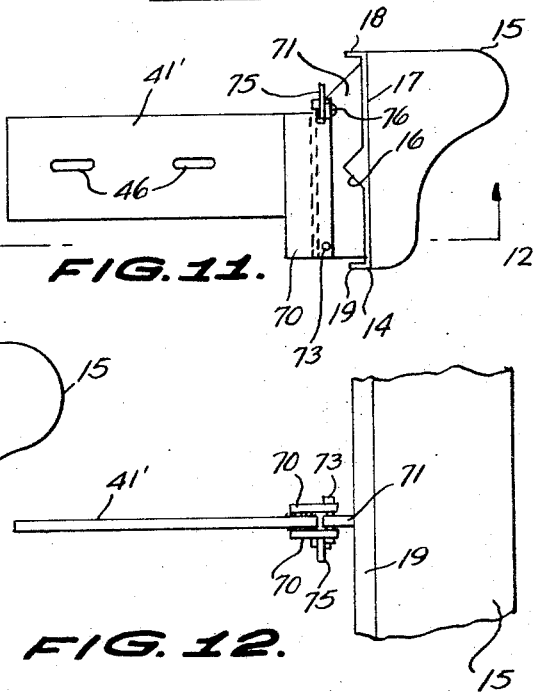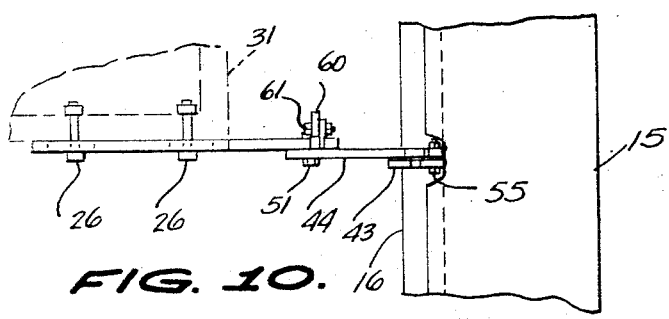

3,427,063
BUMPER BRACKET MOUNTING ASSEMBLY
Lawrence D. Taylor, Carmichael, Calif.
(1610 Kathleen Ave., Sacramento, Calif. 95815)
Filed July 14, 1967, Ser. No. 653,407
U.S. Cl. 293—73                          7 Claims
Int. Cl. B60r 19/02

ABSTRACT OF THE DISCLOSURE

An attachment bracket assembly for securing a bumper to an automobile frame. The assembly consists of an elongated channel bar adapted to be bolted longitudinally inside the bumper. An angle bar is welded longitudinally to the web of the channel bar with its corner projecting outwardly. The web has longitudinal bolting slots. Frame brackets are employed consisting of plates with slotted lugs adapted to be bolted to the sides of the vehicle frame. Each plate has a flange formed with a V-shaped channel engageable over and fitting the angle bar. The flanges have vertical slots transversely-registrable with the first-named lonigtudinal slots for receiving fastening bolts to secure the flanges to the web of the channel bar. In modified versions of the assembly, the brackets may be linked or hinged to the channel bar with the brackets and connecting links notched to receive the angle bar. In these modifications, the brackets are releasably-held adjacent to the channel bar by latches, which, when released, allow the bumper to swing away from its normal position.

---

This invention relates to improvements in bracket assemblies for securing bumpers to motor vehicles, and more particularly to an improved bracket assembly enabling bumpers to be fastened to the frames of automobiles of varying shapes and sizes.

A main object of the invention is to provide a novel and improved universally adjustable bracket assembly for securing replacement bumpers to a wide range of shapes and designs of automobile frames, the bracket assembly involving relatively simple components, being easy to install, having a wide range of adjustments, and enabling a bumper to be quickly and securely fastened to an automobile frame.

A further object of the invention is to provide an improved adjustable attachment bracket assembly for fastening a bumper to an automobile frame, for example, for fastening an improved bumper of the water-displacement type to an automobile in place of the original bumper furnished therewith, the bracket assembly involving inexpensive components, being durable in construction, being easily installed on an automobile without requiring unusual or expensive tools, being adaptable to a wide range of designs of automobile frames, and being adaptable for use with either front or rear bumpers.

A still further object of the invention is to provide an improved attachment bracket assembly for securing a bumper to an automobile frame, the assembly including provisions for allowing the bumper to be swung outwardly and downwardly at times to provide clearance for the opening of a trunk lid or other closure member associated with the automobile, the bracket assembly being neat in appearance, being sturdy in construction, and being arranged so that it can be readily installed on an automobile frame without requiring any modifications of said automobile frame.

Further objects and advantages of the invention will become apparent from the following description and claims, and from the accompanying drawings, wherein:

FIGURE 1 is a perspective view of portions of an improved attachment bracket assembly according to the present invention, shown in separated positions prior to securement to an associated bumper and automobile frame.

FIGURE 2 is a transverse vertical cross-sectional view taken through the attachment bracket assembly of FIGURE 1, shown secured to a bumper.

FIGURE 3 is a fragmentary top plane view, partly in horizontal cross-section, showing the assembly of FIGURE 2 connected to a portion of an automobile frame.

FIGURE 4 is an end elevational view of a bumper attachment bracket assembly similar to that shown in FIGURES 1, 2 and 3, but illustrating a modification.

FIGURE 5 is a fragmentary top plan view of a portion of a bumper attachment bracket assembly according to the present invention, showing another modification.

FIGURE 6 is a perspective view of a further modified form of a portion of an attachment bracket assembly according to the present invention wherein a channel bar is employed which has a flat web, the figure showing a frame attachment plate employed with the channel bar.

FIGURE 7 is an end elevational view showing a further modified form of attachment bracket assembly according to the present invention wherein the associated bumper may be, at times, swung downwardly and outwardly away from the automobile frame to which it is attached to provide clearance for a trunk lid or other swinging body element of the automobile.

FIGURE 8 is a transverse vertical cross-sectional view taken substantially on the line 8—8 of FIGURE 7.

FIGURE 9 is an end elevational view, similar to FIGURE 7, showing the associated bumper in its outwardly and downwardly-swung position.

FIGURE 10 is a fragmentary top plan view of the parts illustrated in the position of FIGURE 9.

FIGURE 11 is an end elevational view, similar to FIGURE 7, showing a further modified form of the swinging bumper attachment assembly according to the present invention.

FIGURE 12 is a fragmentary bottom plan view taken substantially on the line 12—12 of FIGURE 11.

Referring to the drawings, and more particularly to FIGURES 1, 2 and 3, 13 generally designates a bracket assembly for securing a conventional bumper to a motor vehicle frame. For example, the assembly 13 may be employed to secure an improved bumper of the cushioned water-displacement type to an automobile in place of the original bumper furnished with the vehicle. Since the replacement bumpers are made up in standard sizes, it is necessary that the attachment means provide for variations in size and shape of the motor vehicle frames to which they are to be attached. The attachment bracket assembly of the present invention allows for attachment of the replacement bumper to the motor vehicle in spite of a range of variations in shapes and sizes of the motor vehicles.

The assembly 13 comprises an elongated channel bar 14 adapted to be bolted longitudinally inside a conventional replacement bumper 15, the details of securement to the bumper 15 not being shown. An angle bar 16 is welded longitudinally to the mid-portion of the web 17 of channel bar 14, as shown in FIGURE 1, extending parallel to the top and bottom flanges 18 and 19 of the channel bar and being spaced substantially midway therebetween. The channel bar is secured to web 17 with its corner projecting outwardly, namely, projecting in the same direction as the flanges 18 and 19. Web 17 is provided above and below angle bar 16 with a series of longitudinally-extending bolting slots 20.

Designated at 21, 21 are a pair of frame brackets employed for fastening the channel bar 14 and the bumper secured thereto to the frame of an automobile, or other motor vehicle. Each frame bar 21 comprises a plate member 22 having a convergent forwardly-extending end portion 23 to which is welded a lug or bar member 24 provided with a pair of longitudinal fastening slots 25, 25 adapted to be bolted to the side portion of an end corner of the motor vehicle frame, as by means of bolts 26, 26 shown in FIGURE 3. In the arrangement illustrated in FIGURES 1, 2 and 3, the lug bars 24 are straight and extend horizontally. In the modified form of the invention illustrated in FIGURE 4, the lug bars, shown at 24′, are angled so that their slotted portions are inclined upwardly approximately 45° to the horizontal, as shown in full-line view in FIGURE 4. The plate members 22 shown in FIGURE 4 may be reversed to reverse the direction of inclination of the slotted portions of the lug bars 24′ if required by the conditions of the particular installation.

Plate members 22 are formed integrally with V-shaped front channeled portions 28, 28. The slots 29 in said vertical flange portions 28 are transversely-registrable with the slots 20 in web 17 of channel bar 14 and may be thus adjustably-fastened thereto, as by bolts 30. When thus secured, the angle bar 16 is received in the V-shaped channel portions 27 of the frame brackets 21, 21. Thus, the replacement bumper 15 may be fastened to the frame 31 of a motor vehicle by employing a frame bracket assembly 21 at each side of the frame so that the associated bumper 15 is secured transversely to the frame in the manner illustrated in FIGURE 3.

In the arrangement of FIGURE 4, the angled lug bar 24′ may be welded to the plate 23 with its inner end portion 33 extending horizontally, or alternatively, the inner end portion 33 may be welded to the plate 23 in an inclined position with the slotted end portion 24′ of the lug bar extending horizontally, as shown in dotted view in FIGURE 4.

In the modified form of the assembly shown in FIGURE 5, strut bars 35 may be employed to brace the lug bars 24 relative to the web 17 of channel bar 14, the strut bars 35 being arranged outwardly of the bracket assemblies 21 and having their ends welded, respectively, to lug bars 24 and the outer end portions of web 17, as shown.

FIGURE 6 illustrates a modified form of bracket plate assembly, designated generally at 21′ which may be employed where the angle bar 16 is omitted. Thus, the plate portion 22′ of the assembly has a flat end flange 27′ adapted to be secured to the flat web 17 of a channel bar 14 with the end of plate 22′ received between the top and bottom flanges 18 and 19 of the channel bar. The flange 27′ has the top and bottom vertical slots 29, 29, transversely-registrable with the horizontal slots 20 of the web 17 so that they may be secured to the web by means of bolts such as the bolts 30 employed in the form of the invention of FIGURES 1, 2 and 3.

Referring now to FIGURES 7, 8, 9 and 10, a further modification of an attachment bracket assembly according to the present invention is illustrated, the assembly being arranged so that the associated bumper 15 can be swung downwardly and outwardly away from the vehicle frame so as to provide necessary clearance for swinging movement of a trunk lid or similar swinging vehicle body portion, shown diagrammatically in dotted view at 40 in FIGURE 9.

The modified attachment bracket assembly of FIGURES 7 to 10 is designated generally at 41 and comprises a channel bar 14 having an angle bar 16 secured to its web substantially in the same manner as described above in connection with the form of the invention illustrated in FIGURES 1, 2 and 3. Frame attachment plates 42 are linked to vertical upstanding plate members 43 welded to the opposite end portions of the angle bar 16, as by link bars 44. Thus, plate members 42 are provided with longitudinal slots 46, 46 for securement to the opposite sides of the end of a vehicle frame, as by bolts 26, 26, as shown in FIGURE 10. The outer end portions of the plate members 42 are widened, as shown at 47, providing top and bottom segments 48 and 49, and the outer end of each plate member is provided with a V-notch 50 shaped to closely receive the angle bar 16. The link bar 44 associated with each connection bracket assembly is pivotally-connected at 51 to the lower end portion of the bottom wing 49 of enlarged portion 47, and the outer edge of the link bar is formed with a V-notch 52 which is registrable with the V-notch 50 when link bar 44 is in a vertical position. The upper forward corner of the link bar 44 is pivotally-connected at 55 to the inner top marginal portion of an upstanding plate member 43, as shown in FIGURE 9, whereby the bumper 15 is allowed swinging movement from the position thereof shown in FIGURE 7 substantially to the position thereof shown in FIGURES 9 and 10, namely, may be swung downwardly and outwardly to provide clearance for swinging movement of the hinged closure element 40.

The top edge portion of upper wing 48 and the associated upstanding plate element 43 are formed with registrable notches 56 and 57, and the top edge portion of link bar 44 is likewise formed with a notch 58 located so as to be registrable with the notches 56 and 57 when the bumper 15 is substantially in its normal position, shown in FIGURE 7. A pivoted latch bar 60 is provided on each top wing 48, each latch bar 60 being pivoted at 61 to a vertical lug element 62 welded to the top portion of the associated wing 48 and projecting thereabove, as shown in FIGURE 8, the latch bar 60 being swingable downwardly and being receivable in the registered notches 56, 58 and 57 to lock the bumper 15 in its normal elevated position shown in FIGURE 7. A pivoted latch bar 60 is provided on each of the attachment bracket assemblies 41. When it is desired to swing the bumper 15 downwardly and outwardly so as to provide clearance for the hinged closure member 40, the latch bars 60 are raised to disengage them from the notches 56, 57 and 58, thus releasing the bumper 15 for movement from its normal position of FIGURE 7 to its outwardly and downwardly-swung position of FIGURES 9 and 10.

FIGURES 11 and 12 illustrate another form of swinging attachment assembly according to the present invention. In the arrangement illustrated in FIGURES 11 and 12, the bracket plate assemblies are shown at 41′, said assemblies being provided with the horizontal slots 46, 46 for attachment to the sides of the end portions of a vehicle frame, as in the previously-described form of the invention. Welded to the outer end portion of each plate 41′ are a pair of parallel vertical plate members 70, 70, and pivotally-connected between the lower end portions of the pairs of plate members 70, 70 are respective vertical plate members 71 which are welded transversely to the web 17 of the channel bar 14 which is secured in the associated bumper 15. The respective plate members 71 are rigidly-connected by welding, or the like, to the web 17, and are suitably-notched to receive the median angle bar 16. Thus, the respective vertical plate elements 71 are hingedly-connected at 73 to the lower end portions of the plate members 70 associated with the opposite bracket plates 41′. Pivoted latch assemblies 75, similar to those employed in the bracket assemblies illustrated in FIGURES 7 to 10 are employed, the latch bars 75 being engageable in registering notches provided in the top end portions of the plate elements 70, 70 and the plate element 71 received therebetween, each latch bar 75 being suitably-pivoted at 76 to one of the associated vertical plate members 70. With the latch bars 75 in their horizontal positions and received in the notches provided therefor in plate members 70 and 71, the bumper 15 is locked in its normal elevated position, shown in FIGURE 11. The bumper may be swung downwardly by elevating the latch bars 75, allowing the bumper to pivot around the pivot connections 73, thereby providing the required clearance for outward swinging movement of a trunk lid, or similar hinged body closure element.

While certain specific embodiments of attachment bracket assemblies for securing a bumper to an automobile frame have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a bumper, an elongated channel-shaped bar longitudinally-secured to the bumper, said bar having a web and having top and bottom horizontally-directed flanges, a longitudinally outwardly-directed rib on said web spaced between said flanges, said rib comprising an angle bar welded to said web, said angle bar being located substantially midway between said flanges, a pair of frame brackets adapted to be bolted to the opposite sides of a vehicle frame, each frame bracket having an outer end portion formed with a notch in which said rib is receivable, and means securing said frame bracket outer end portions perpendicularly to said web, said securing means comprising respective means swingably-connecting said frame brackets to the channel-shaped bar, and latch means releasably locking said channel-shaped bar in an elevated position with the bumper located adjacent the notched outer end portions of the frame brackets, whereby the bumper may be swung outwardly at times by releasing said latch means.

2. The structural combination of claim 1, and wherein each frame bracket outer end portion includes a laterally-directed continuous flange, the intermediate portion of the last-named flange extending along said notch.

3. The structural combination of claim 1, and wherein the top and bottom portions of the last-named flange are formed with vertical slots, said web having horizontal slots transversely-registering with said vertical slots, and fastening bolts engaged through the transversely-registering slots.

4. The structural combination of claim 1, and wherein each frame bracket includes a slotted lug portion arranged for bolting to the side of a vehicle frame.

5. The structural combination of claim 1, and wherein said latch means comprises respective vertical plate elements secured to said web, said plate elements having top edges formed with detent notches, said frame brackets being formed at their top edges with detent notches registrable with said first-named detent notches, and respective transverse latch bolts pivoted to said frame brackets and being lockingly-receivable in the registering pairs of detent notches.

6. The structural combination of claim 5, and wherein the means swingably-connecting the frame brackets to the chanel-shaped bar includes link bars connecting the channel-shaped bar to the brackets, said link bars being formed with notches to receive the angle bar.

7. The structural combination of claim 6, and wherein the link bars are connected between the lower outer end portions of the frame brackets and the top portions of the plate elements, and wherein the upper ends of the respective link bars are formed with detent notches registrable with the registering pairs of detent notches and located to also receive the latch bolts.

References Cited

UNITED STATES PATENTS

| | | | |
|---|---|---|---|
| 1,383,515 | 7/1921 | Baumgartl | 293—98 |
| 1,538,190 | 5/1925 | Kolb | 293—98 XR |
| 1,637,752 | 8/1927 | Laher | 293—64 XR |
| 1,754,104 | 4/1930 | Hoffman | 293—73 |
| 2,186,137 | 1/1940 | Halladay | 293—85 |
| 2,230,516 | 2/1941 | Radtke | 293—73 XR |

FOREIGN PATENTS 274,229   7/1927   Great Britain.

ARTHUR L. LA POINT, *Primary Examiner.*

H. BELTRAN, *Assistant Examiner.*

U.S. Cl. X.R.

293—71, 89, 98, 101